(12) United States Patent
Chethik

(10) Patent No.: US 6,267,329 B1
(45) Date of Patent: *Jul. 31, 2001

(54) MEDIUM EARTH ORBIT COMMUNICATIONS SATELLITE SYSTEM

(75) Inventor: Frank Chethik, Palo Alto, CA (US)

(73) Assignee: Loral Aerospace Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/231,416

(22) Filed: Jan. 14, 1999

(51) Int. Cl.[7] ..................................................... B64G 1/02
(52) U.S. Cl. ..................................... 244/158 R; 455/12.1
(58) Field of Search ............ 244/158 R; 455/12.1–13.3, 455/427–430; 701/13; 342/359, 357, 368

(56) References Cited

U.S. PATENT DOCUMENTS 5,813,634 * 9/1998 Pizzicaroli et al. ............... 244/158 R

FOREIGN PATENT DOCUMENTS 0 648 027 A1   4/1995 (EP) .

WO 95/13671   5/1995 (WO) .

OTHER PUBLICATIONS

Castiel, David; "The Ellipso Mobile Satellite System"; International Mobile Satellite Conference 1995; Jun. 6–8, 1995; pp. 409–418.

* cited by examiner

Primary Examiner—Galen L. Barefoot
(74) Attorney, Agent, or Firm—Perman & Green, LLP

(57) ABSTRACT

A Medium Earth Orbit (MEO) satellite constellation comprising two satellite subconstellations. Each of the two satellite subconstellations comprises three cross-linked satellites. The cross-linked satellites of both subconstellations lay within or near the equatorial plane, and follow a substantially circular orbit. Individual ones of the satellites within each respective subconstellation are offset from each of two adjacent satellites of at least one of the other subconstellations by a predetermined angle. Each of the satellite subconstellations relays communications between a terrestrial node and at least one mission platform in a manner that minimizes the number of satellite links necessary for relaying the communications. At least one satellite from each respective subconstellation is always within a view of the terrestrial node.

23 Claims, 7 Drawing Sheets

MEDIUM EARTH ORBIT COMMUNICATIONS SATELLITE SYSTEM

FIELD OF THE INVENTION

This invention relates to satellite-based communication systems and, more particularly, to a satellite-based communication system that uses a medium earth orbit communication satellite constellation.

BACKGROUND OF THE INVENTION

In satellite based communication system, employing multiple relay satellites, it is often required to communicatively link at least two of the satellites in order to facilitate global communication between stations located, for example, on opposite sides of the earth. These relay satellites typically reside in synchronous orbit at an altitude of approximately 22,300 miles. The long distances between these synchronous orbit satellites can impose costs relating to the high powered transmissions and the large antennas required to support the links between these satellites.

The use known types of lower altitude relay satellite systems can also involve drawbacks. By example, longer altitude relay satellites can suffer from discontinous interconnections and also may provide only limited coverage.

Therefore, it is desirable to provide a satellite relay communication system which is located at a lower altitude than synchronous orbit, and which thus shortens the communication range while providing nearly global coverage U.S. Pat. No. 5,439,190, issued to Horstein et al., discloses a satellite-based cellular transcommuniations system employing a constellation of telecommunications satellites in medium earth orbit. The system provides multibeam radio frequency communications links for for worldwide cellular telephone service. The satellites are placed in a plurality of inclined orbits about the earth. The orbital characteristics are tailored to maximize, by example, the coverage area of the satellites, while minimizing propagation time delays and the number of beam-to-beam satellite-to-satellite handovers. The Horstein patent discloses additional features which are said to eliminate beam-to-beam and satellite-to-satellite handovers, thereby proposing a reduction in the likelihood of dropout.

U.S. Pat. No. 5,422,647, issued to Hirshfield et al., discloses a communications satellite payload for providing efficient communications between user devices, such as hand held cellular telephones, and terrestrial gateways. The satellite payload simultaneously supports a plurality of independent antenna beams on both the uplink and downlink for user devices employing full duplex communications. The satellite payload is carried by one satellite of a plurality of such satellites in a low earth orbit (LEO) constellation.

Another patent of interest to this invention is U.S. Pat. No. 5,448,623, issued to Wiedeman et al. This patent discloses a wireless telephone system capable of servicing a roaming wireless telephone user. The system includes, by example, a plurality of terrestrial communications links, at least one orbiting satellite, and at least one terrestrial-based gateway. The system operates by effecting communication between a terrestrial wireless telephone end user transceiver apparatus and a terrestrial communications link via a single relay satellite. The gateway effects ultimate decision on linking cooperation with a network database to effect hand-off from a first orbiting satellite to a second orbiting satellite.

OBJECTS OF THE INVENTION

It is a first object of this invention to provide a Medium Earth Orbit (MEO) communication satellite system comprising N satellite subconstellations, wherein each of the N satellite subconstellations comprises a respective plurality of cross-linked satellites for relaying communications between a terrestrial node and at least one mission platform.

It is a second object of this invention to provide a Medium Earth Orbit (MEO) communication satellite system comprising N satellite subconstellations, wherein satellites from respective ones of the N satellite subconstellations are cross-linked on a continuous basis in order to avoid problems associated with dropping and reeacquiring satellite cross-links.

It is a third object of this invention to provide a Medium Earth Orbit (MEO) communication satellite system comprising N satellite subconstellations, wherein at least one satellite from respective ones of the N satellite subconstellations is always within view of a terrestrial node.

It is a fourth object of this invention to provide a Medium Earth Orbit (MEO) communication satellite system comprising satellite subconstellations, wherein at least one satellite from respective ones of the N satellite subconstellations is always within view of at least one mission platform, located within the coverage area served by the system.

It is a fifth object of this intention to provide a Medium Earth Orbit (MEO) communication satellite system that provides nearly global coverage.

It is a sixth object of this invention to provide a Medium Earth Orbit (MEO) communication satellite system for relaying a communication between a terrestrial node and at least one terrestrial-based or airborne platform in a manner that minimizes the number of satellite cross-links required to be traversed in order to complete the communication.

Further objects and advantages of this invention will become apparent from a consideration of the drawings and ensuing description.

SUMMARY OF THE INVENTION

The foregoing and other problems are overcome and the objects of the invention are realized by a Medium Earth Orbit (MEO) communication satellite system, and by a method for providing communications between a terrestrial node and at least one user terminal (also referred to as a "mission platform") via a MEO satellite constellation. The MEO communication satellite system comprises a MEO satellite constellation, a terrestrial node, and a plurality of mission platforms. The MEO satellite constellation comprises a plurality of satellites that are uniformly arranged in at least two subconstellations P1 and P2. The satellite of each subconstellation follow a circular or nearly circular orbit. In a preferred embodiment of the invention, there are, three satellites located in subconstellation P1 and three satellites located in subconstellation P2. All of the satellites are located at about the same altitude between approximately 5,000 and 10,000 nautical miles. The satellites are thus in continuous motion with respect to a point on the surface of the earth. The subconstellations P1 and P2 are both located in an equatorial plane. Individual ones of the satellites within subconstellation P1 are offset from each of two adjacent satellites of subconstellation P2, and individual ones of the satellites within subconstellation P2 are offset from each of two adjacent satellites of subconstellation P1, by a co-longitudinal angle (θ) of approximately 60°. The MEO satellite constellation provides continuous coverage between approximately 70° N Latitude and 70° S Latitude for terrestrial-based mission platforms. The MEO satellite constellation also provides total coverage for satellites located at all latitudes above altitudes of approximately 150 nautical miles.

According to one aspect of the invention, satellites located it subconstellation P1 are cross-linked on a continuous basis, forming a "ring" configuration. Similarly, satellites located in subconstellation P2 are cross-linked on a continuous basis, also forming a "ring" configuration. By leaving the satellites in the respective subconstellations P1 and P2 cross-linked in this manner, problems associated with the dropping and reacquiring of cross-links between satellites are avoided.

Each satellite has a data reception and transmission system which enables the satellite to connect to the terrestrial node, the mission platforms, and to other satellites that are located within a same subconstellation as the satellite. The data reception and transmission system includes, by example, a communications controller, a communications processor, and a plurality of sets of steerable antennas. According to another embodiment of the invention, laster telescopes, optical transmitters, and optical receivers may be used in lieu of RF systems, to provide optical cross-links.

The communications controller controls antenna pointing directions based upon, by example, an automatic tracking technique or sphermis information carried by a signal received from the terrestrial node.

The mission platforms may comprises by example, at least one satellite in low earth orbit (also referred to as an "orbiting mission platform" or a "mission platform satellite"), at least one aircraft (also referred to as an "airborne mission platform") , and one or more terrestrial-based user-communication systems (also referred to as a "terrestrial mission platforms").

Further in accordance with this invention, the satellites from subconstellation P1 are arranged in a manner such that before a first one of the satellites disappears from the field of view of the terrestrial node, a second one of the satellites from the subconstellation P1 comes into the field of view of the terrestrial node. Similarly, the satellites from subconstellation P2 are arranged in a manner such that before a first one of the satellites disappears from the field of view of the terrestrial node, a second one of the satellites from subconstellation P2 comes into the field of view of the terrestrial node. In this manner, at least one of the satellites from subconstellation P1, and it least one of the satellites from subconstellation P2, are always within the field of view of the terrestrial node. Similarly, at least one of the satellites from subconstellation P1, and at least one of the satellites from subconstellation P2, are always within view of individual ones of the mission platforms located within the coverage area of the system.

Also in accordance with the invention, the terrestrial node controls the manner in which signals are relayed about each of the subconstellations. In a preferred embodiment of the invention, the terrestrial node controls the directions in which signals are relayed within each subconstellation in accordance with a position of a satellite from each respective subconstellation relative to a reference plane L.

In accordance with a further embodiment of the invention, a spare satellite is provided for replacing one of the satellites of the constellation in the event that the satellite fails. This spare satellite normally may be located ("parked") in a low earth orbit, and is controllable for being positioned to functionally replace the failed MEO satellite.

A method in accordance with the invention provides communications between the terrestrial node and at least one mission platform via the satellite constellation. The method comprises a first step of transmitting a signal from the terrestrial node to a selected one of the subconstellations. The selected subconstellation is preferably one which can relay the signal between the terrestrial node and the mission platform in a manner that minimizes a number of satellite cross-links. After the signal is received by tire selected subconstellation, the signal is relayed within the subconstellation in a predetermined manner (i.e., a manner which is predetermined and controlled via a command signal supplied from terrestrial node). The signal, carries, in addition to the desired communication, at least a downlink command. Based upon the downlink command, a next step includes downlinking at least a portion of the signal from the selected subconstellation to the mission platform.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1A:
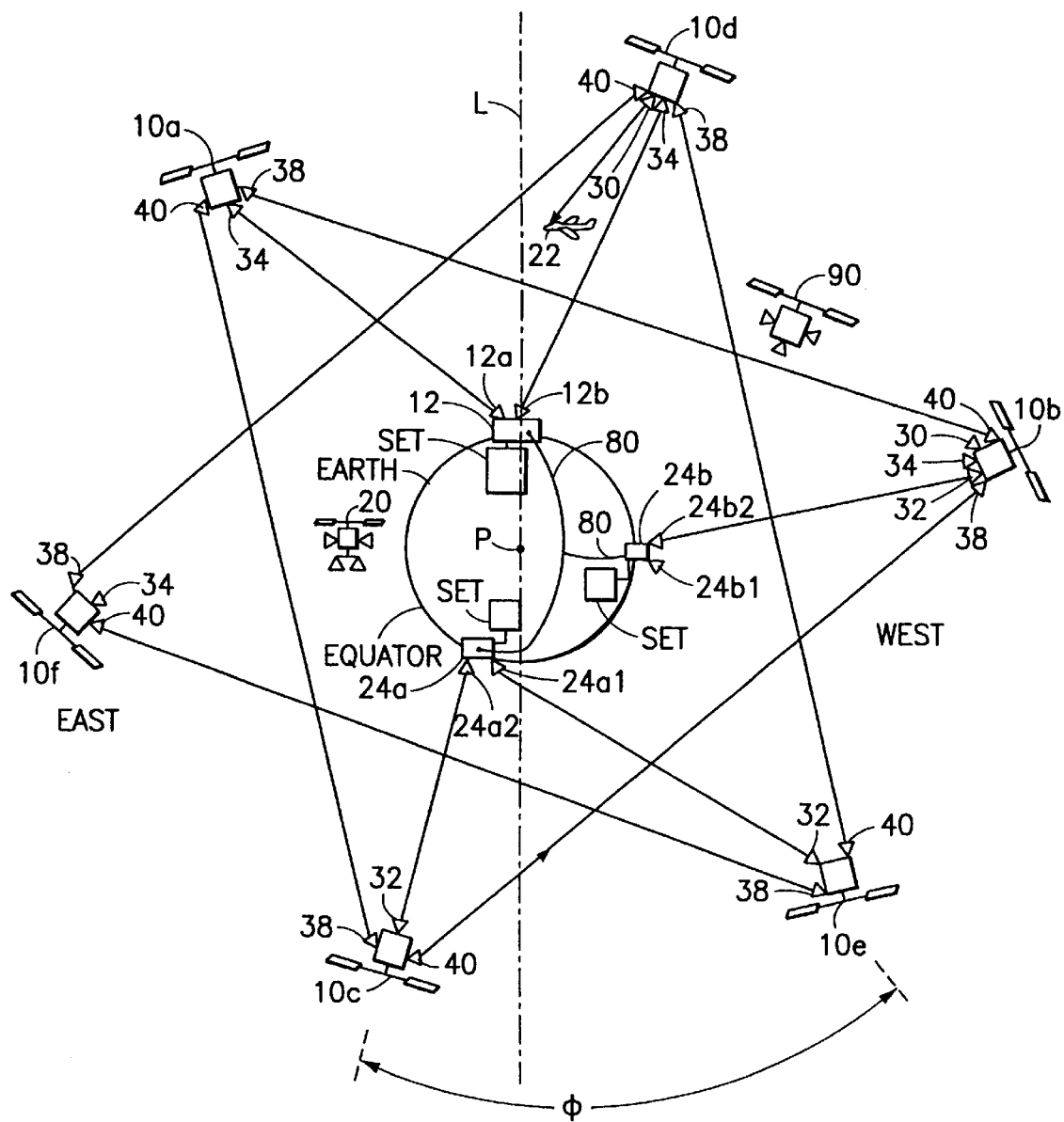
FIG. 1a illustrates a Medium Earth Orbit (MEO) communication satellite system that is constructed in accordance with the invention, wherein each individual satellite of the MEO Communication satellite system is located at a position along its orbit which corresponds to a time T1.
Figure 1B:
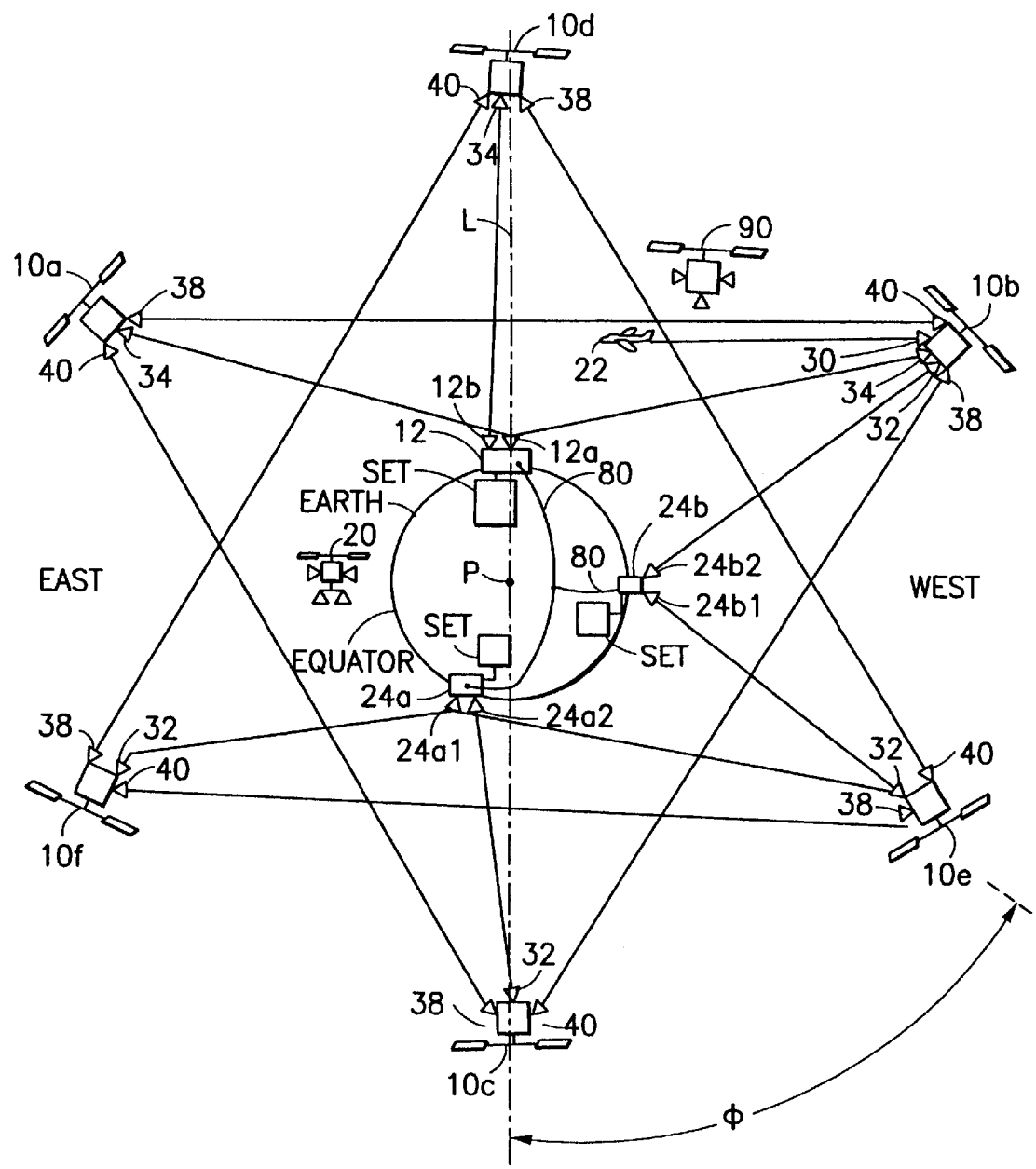
FIG. 1b illustrates the Medium Earth Orbit (MEO) communication satellite system of FIG. 1a, wherein each individual satellite of the MEO communication satellite system is located at a position along its orbit which corresponds to a time T2.
Figure 1C:
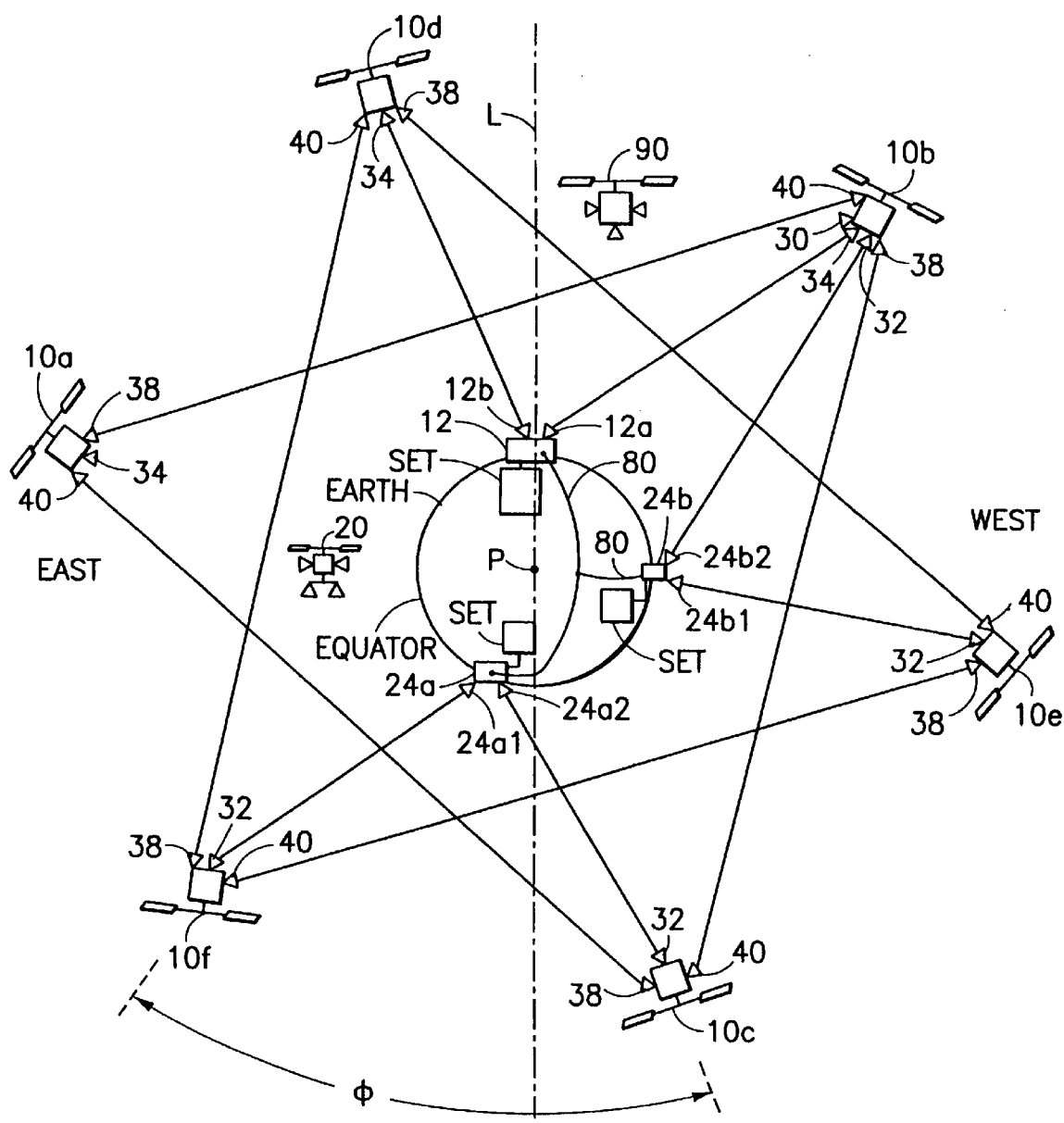
FIG. 1c illustrates the Medium Earth Orbit (MEO) communication satellite system of FIG. 1a, wherein each individual satellite of the MEO communication satellite system is located at a position along its orbit which corresponds to a time T3.

FIGS. 1a–1c illustrate a Medium Earth Orbit (MEO) communication satellite system, that is constructed in accordance with a preferred embodiment of this invention, when viewed from a perspective looking down on a pole P of the earth. The MEO communication satellite system comprises a MEO satellite constellation, a plurality of subscriber terminals (hereinafter referred to as "mission platforms") and a terrestrial node 12.

The MEO satellite constellation comprises a plurality of satellites 10a10f that are uniformly arranged in at least two "subconstellations" P1 and P2, both of which are located in or near the equatorial plane. The satellites of each subconstellation follow a circular or nearly circular orbit. The satellites 10a–10f are in continuous motion with respect to a point on the surface of the earth, and have an orbital period of approximately 13.5 hours.

In a preferred embodiment of the invention, wherein there are two subconstellations, individual ones of the satellites within subconstellation P1 are offset from each of two adjacent satellites of subconstellation P2, and individual ones of the satellites within subconstellation P2 are offset from each of two adjacent satellites of subconstellation P1, by a co-longitudinal angle (θ) of approximately 60°. Also in the preferred embodiment of the invention, three satellites 10a–10c are located in the subconstellation P1, and three satellites 10d–10f are located in the subconstellation P2, although more than this number car be employed. Each satellite within a subconstellation is approximately spaced from the other two satellites of the same subconstellation, thereby forming, for a three satellite subconstellation, an equilateral triangle. All of the satellites are located at about the same altitude between approximately 5,000 and 10,000 nautical miles, and thus between the inner and outer van Allen radiation belts. Since satellites located at these altitudes generally have longer functional lives than other satellites which orbit within or frequently travel through the van Allen radiation belts, the satellites of the present invention can have longer functional lifetimes than these other satellites.

The terrestrial node 12 is, by example, a continental U.S. (CONUS) gateway 12. In an exemplary embodiment of the invention, the terrestrial node 12 has an antenna 12a for communicating with satellites 10a–10c from subconstellation P1. The terrestrial node 12 also has antenna 12b for communicating with satellites 10d–10f from subconstellation P2. The terrestrial node 12 also comprises a communications controller 54, a communications processor 52, and an antenna pointing control circuit 55. The communications controller 54 controls the steering of the antenna 12a and 12b with the pointing control circuit 55.

The plurality of mission platforms may be, by example, a low altitude satellite (hereinafter referred to as an "orbiting mission platform") 20, an aircraft (hereinafter referred to as an "airborne mission platform") 22, and terrestrial-based user-communication systems 24a and 24b (hereinafter referred to as "terrestrial mission platforms"). The satellite constellation enables the mission platforms to be interconnected with the terrestrial node 12, as will be described below.

The MEO satellite constellation provides continuous earth coverage between approximately 70° N Latitude and 70° S Latitude for terrestrial mission platforms. The MEO satellite constellation also provides total coverage for orbiting mission platforms (e.g., satellite 20) located at altitudes above approximately 150 nautical miles.

In an exemplary embodiment of the invention, the terrestrial mission platform 24a has an antenna 24a1 for communicating with satellites from subconstellation P2. The terrestrial mission platform 24a may also have an antenna 24a2 for communicating with satellites from subconstellation P1. Similarly, the terrestrial mission platform 24b has an antenna 24b1 for communicating with satellites from subconstellation P2. The terrestrial mission platform 24b may also have an antenna 24b2 for communicating with satellites from subconstellation P1.

Also, in a preferred embodiment of the invention, each mission platform independently steers its respective antennas to point towards respective ones of the satellites 10a–10f that come within the mission platform's view. This may be accomplished by any suitable technique including, by example, technique using a satellite ephemeris table (SET) that is associated with the mission platform.

Figure 2:
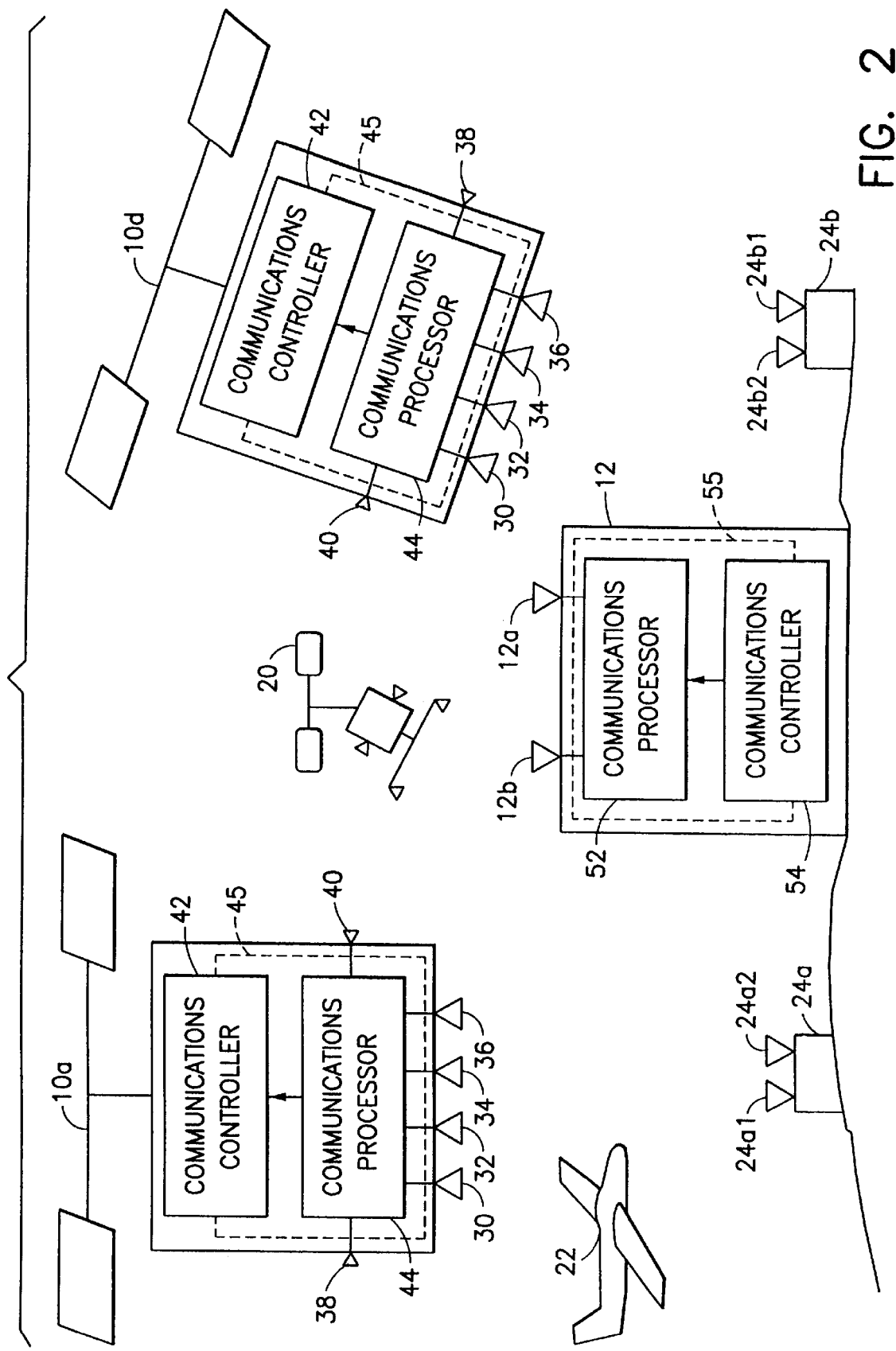
FIG. 2 is an illustration of a portion of the Medium Earth Orbit (MED) communication satellite system constructed in accordance with the invention, showing two satellites, a terrestrial node, and various mission platforms.
Figure 3A:
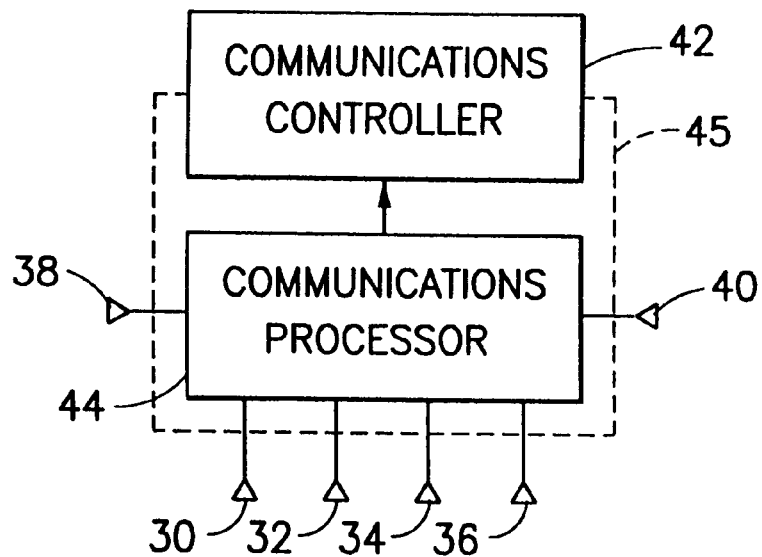
FIG. 3a illustrates a data reception and transmission system of individual satellites of the Medium Earth Orbit (MEO) communication satellite system of the invention.

Referring to FIGS. 2 and 3a, each satellite 10a–10f has a data reception and transmission system which enables the satellite to correct to the terrestrial node 12, to the mission platforms, and to the other satellites that are within the same subconstellation as the satellite. More particularly, each satellite 10a–10f comprises a communications controller 42, a communications processor 44, and antenna pointing control circuit 45, and a plurality of antenna 30, 32, 34, 36, 38, 40. Each satellite's communications controller 42 controls directions in which signals are relayed by the satellite, as will be described below. In a preferred embodiment of the invention, each satellite is capable of transmitting signals bi-directionally within the satellite's respective subconstellation, to adjacent satellites of the same subconstellation. The communications processor 44 of each satellite converts to baseband at least some signals received by the satellite, extracts information (e.g., commands received from the terrestrial node 12) from the received signals, and then supplies routine and other information to the communications controller 42. The pointing control circuit 45 adjusts the steering of the antennas as controlled by the Communications controller 42.

The direction in which the communications controller 42 points the antennas can he determined based upon the information (e.g., commands received from the terrestrial node 12) supplied to the communications controller 42 from the communications processor 44, as will be described below. In an exemplary embodiment of the invention, antenna 30 is used to provide a communications link with the airborne mission platform 22. Antenna 32 of the satellites 10a–10c from subconstellation P1 is used to communicate with the antennas 24b2 and 24a2 of the terrestrial mission platforms 24b and 24a, respectively. Antenna 32 of the satellites 10c–10f from subconstellation P2 is used to communicate with the antennas 24b1 and 24a1 of the terrestrial mission platforms 24b and 24a, respectively. Antenna 34 of the satellites 10a–10c is used to provide a communications link with the antenna 12a of the terrestrial node 12. Antenna 34 of the satellites 10d–10f is used to provide a communications link with the antenna 12b of the terrestrial node 12. Antenna 36 is used to provide a communications link, with the orbiting mission platform 20.

Referring to FIGS. 1a–1c , antenna 38 of the satellite 10a from subconstellation P1 is for transmitting communications to and for receiving communications from an antenna 40 of satellite 10b from subconstellation P1. Similarly, antenna 40 of satellite 10a for transmitting communications to and for receiving communications from an antenna 38 of satellite 10c of subconstellation P1, and antenna 40 of satellite 10c is for transmitting communications to and for receiving communications from an antenna 38 of satellite 10b. Likewise, antenna 38 of satellite 10d from subconstellation P2 is for transmitting communications to and for receiving communications from an antenna 40 of satellite 10e from subconstellation P2. Also, antenna 40 of satellite 10d is for transmitting communications to and for receiving communications from an antenna 38 of satellite 10f of subconstellation P2, and antenna 40 of satellite 10f is for transmitting communications to and for receiving communications from antenna 38 of satellite 10e.

It should be noted that the number of steerable antennas that each individual satellite 10a–10f may have depends upon the particular application in which the constellation is being employed, and that the number of antennas illustrated in FIGS. 1a–1c, 2, and 3a are intended to be exemplary in nature, and not limiting in space.

In accordance with embodiment of the invention, at least one of the antennas of the respective satellites 10a–10f, the mission platforms, and the terrestrial node 12 may be an omnidirectional antenna. For cases in which omnidirectional antennas are employed, no steering of antennas is required. However, the power required to transmit communications from the omnidirectional antennas will generally be greater than the power required to transmit communications from the steerable, directional antennas. Also, laser telescopes, optical transmitters, and optical receivers may be used in lieu of RF systems for providing optical cross-links.

As described above, satellites within respective ones of the subconstellations P1 and P2 communicate with one another via antennas 38 and 40. The antennas 38, 40 may be controllably steered in a manner such that there is a continuous interconnection, or "cross-link", via a signal (also referred to as an "inter-satellite link") (e.g., an RF signal or an optical signal) linking these satellites. More particularly, in subconstellation P1, satellite 10a is cross-linked with satellites 10b and 10c, both of which are also cross-linked. Similarly, in subconstellation P2, satellite 10d is cross-linked with satellites 10e and 10f, both of which are also cross-linked. By having cross-links between the satellites 10a–10c, 10d–10f on a continuous basis, problems associated with dropping and reeacquiring satellite cross-links are avoided, and thus the satellite constellation exhibits a greater reliability for relaying communications than satellite systems employing techniques for dropping and reeacquiring satellite cross-links. For the purposes of this description, the term "ring" is used to denote the cross-linked satellites 10a–10c of subconstellation P1, and to denote the cross-linked satellites 10d–10f of subconstellation P2. Communications and communication signals can be passed in both directions through the crosslinks, either in a full or half duplex manner.

The use of satellite rings in conjunction with the terrestrial node 12 enables communications to occur at all times between the terrestrial node 12 and mission platforms located at various locations within the constellation's coverage area of the earth. This is accomplished by having the satellites arranged within the respective subconstellations in a manner such that one satellite from subconstellation P1, and one satellite from subconstellation P2, are always in view of the terrestrial node 12. That is, satellites 10a–10c from subconstellation P1 are arranged in a manner such that before one of the satellites 10i–10c disappears from the field of view of antenna 12a of the terrestrial node 12, another satellite from subconstellation P2 comes into the field of view of the antenna 12a. Similarly satellites 10c10f from subconstellation P2 are arranged in a manner such that before one of the satellites 10d–10f disappears from the field of view of antenna 12b of the terrestrial node 12, another satellite from subconstellation P2 comes into the field of view of the antenna 12b.

This may )e further understood in consideration of the exemplary case shown in FIGS. 1a–1c. In FIG. 1a, each satellite 10a–10f is shown to be located at a position along its orbit which corresponds to a time T1. At this time, the satellites 10a and 10d are in view of the terrestrial node 12. The antennas 12a and 12b of the terrestrial node 12 are pointing towards the satellites 10a and 10d, respectively, as controlled by the communications controller 54 in accordance with any suitable technique (e.g. an automatic tracking technique).

In FIG. 1b, each satellite 10a–10f is located at a position along its orbit which corresponds to a time T2. At this time, the satellites 10d and 10a are still within the field of view of the antennas 12b and 12a, respectively, of the terrestrial node 12. Also at this time, the communications controller 54 of the terrestrial node 12 controls the positioning of the antenna 12a to point towards the satellite 10b such that satellite 10b also comes within the view of the antenna 12a. Thus, at time T2 the satellites 10a and 10b are both within the field of view of the antenna 12a. It should be noted that the communications controller 54 may position the antenna 12a in accordance with any suitable technique including, by example, a technique that is based upon data from a satellite ephemeris table (SET) associated with the terrestrial node 12.

Thereafter, and referring to FIG. 1c, at the time T3 the satellite 10a disappears front the field of view of the antenna 12a, and the satellites 10b and 10d remain within the field of view of the antennas 12a and 12b, respectively. In this manner, before the satellite 10a from subconstellation P1 disappears from the field of view of the antenna 12a of the terrestrial node 12, the satellite 10b from the same subconstellation P2 comes into the field of view of the antenna 12a.

In a similar manner, one of the satellites 10a–10c from subconstelation P1, and one of the satellites 10d–10f from subconstellation P2, are always within view of individual ones of the mission platforms located within the coverage area served by the MEO communication satellite system.

The exemplary illustration of FIG. 2 shows one satellite 10a from subconstellation P1 and one satellite 10d from subconstellation P2 in view of the terrestrial node 12, the lower altitude orbiting mission platform 20, as well as the terrestrial mission platforms 24a, 24b, and the airborne mission platform 22.

Figure 3B:
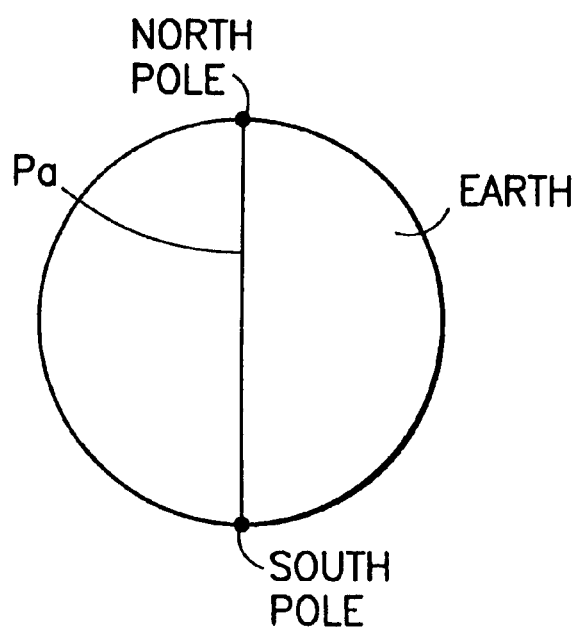
FIG. 3b illustrates a polar axis which extends between the earth's North and South Poles.
Figure 4:
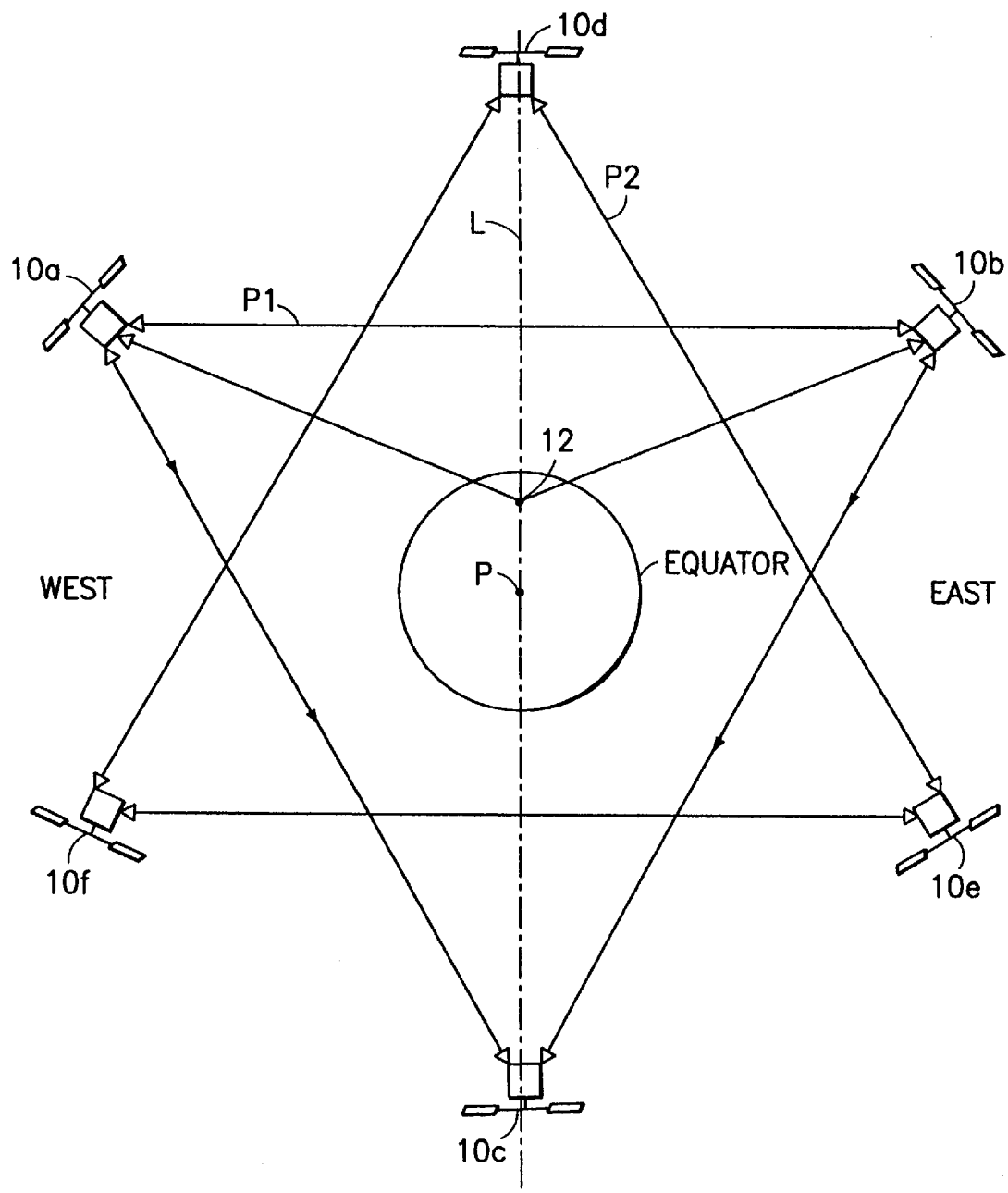
FIG. 4 is an illustration of a portion of the Medium Earth Orbit (MEO) communication satellite system of the invention, showing two subconstellations of satellites and a terrestrial node.
Figure 5:
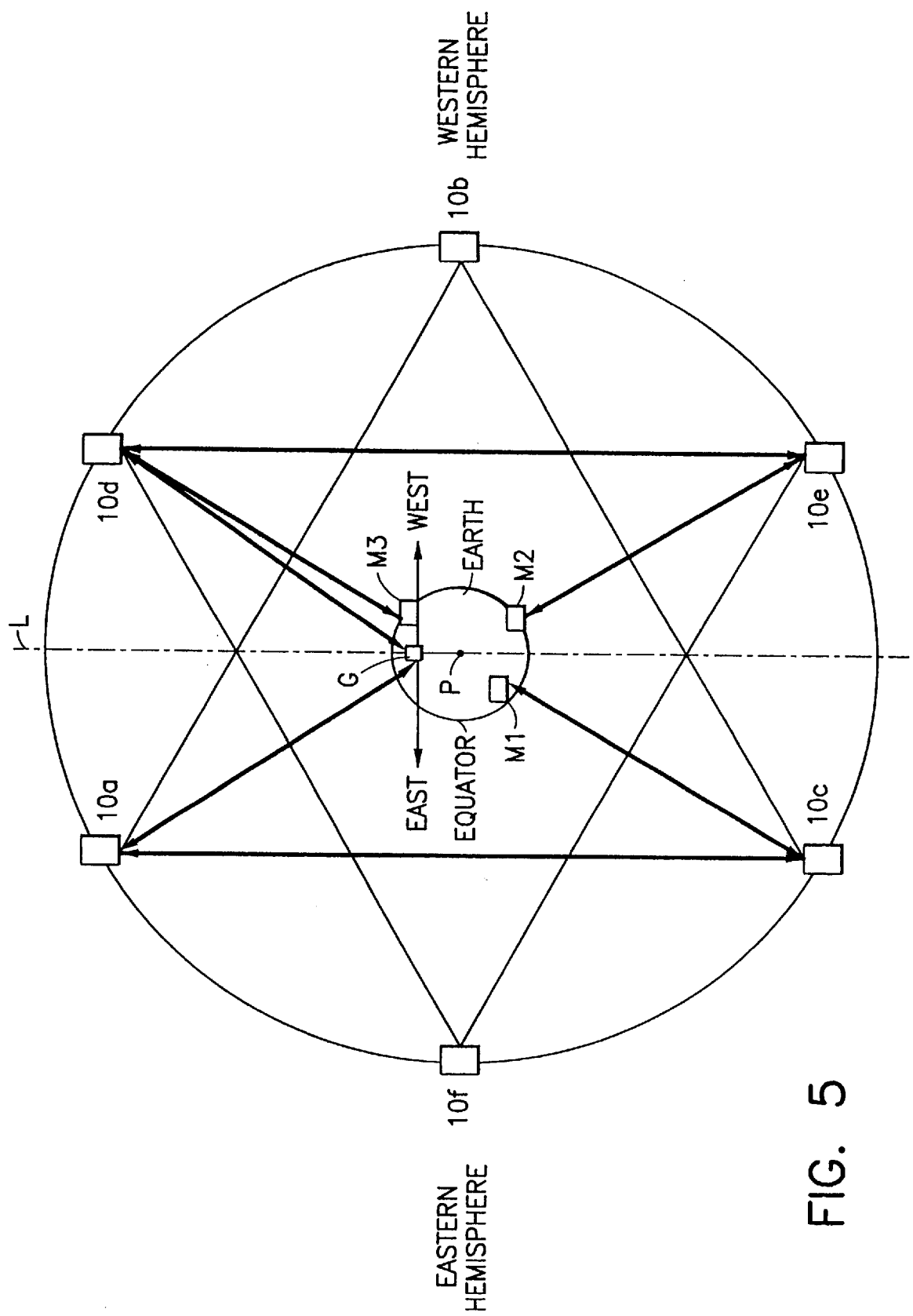
FIG. 5 is a further illustration of the Medium Earth Orbit (MEO) communication satellite system constructed in accordance the invention.

Having described a number of characteristics of the MEO communication satellite system, another aspect of the invention will now be described. This aspect of the invention may be understood in view of FIG. 5 which shows satellites 10a–10f, terrestrial node G, and terrestrial mission platforms M1, M2, and M3. Also shown in FIG. 5 is a reference plane L (also referred to as a "bisector plane") . The reference plane L passes through the terrestrial node G and a polar axis $P_a$ located beneath the pole P, and thus may be considered to be orthogonal to the equatorial plane. The polar axis $P_a$ extends from the North Pole to the South Pole of the earth, as is shown in FIG. 3b. The satellites 10a–10f orbit the earth in, by example, a counterclockwise direction with respect to the earth as viewed from a perspective looking down on the North Pole. The region shown to the east of the bisector plane L is designated for the purposes of this description only, as an eastern hemisphere. Also, the region shown to the west of the bisector plane L is designated, for the purposes of this description only, as a western hemisphere.

In accordance with a preferred embodiment of the invention, the terrestrial node controls the manner in which signals are relayed about each of the subconstellations P1 and P2 by providing a command signal to the subconstellations. The terrestrial node performs this function in accordance with the orbital position of at least one of the satellites from the respective subconstellations relative to the bisector plane L. Referring to FIG. 5, for a case wherein one or more satellites (e.g., satellite 10d and 10e) from a respective one of the subconstellations (e.g., subconstellation P2) are located in the western hemisphere, and at least one of those satellites is within view of the terrestrial node, the terrestrial node G can control a sufficient number of those satellites to relay communications between the terrestrial node G and a mission platform (e.g., terrestrial mission platform M2 or M3) located in the western hemisphere. Also, for a case in which one or more satellites (e.g., satellites 10a and 10c) from a respective one of the subconstellations (e.g., subconstellation P1) are located in the eastern hemisphere, and at least one of those satellites is in view of the terrestrial node, tire terrestrial node G can control a sufficient number of those satellites to relay communications between the terrestrial node G and a mission platform (e.g., terrestrial mission platform M1) located in the eastern hemisphere. The command signal provided by the terrestrial node G to a particular subconstellation may specify, by example, a direction in which the subconstellation's satellites are to relay signals about the subconstellation.

It should be noted that the manner in which each satellite relays received signals may be controlled at different locations within the satellite's respective orbit, and not only at the locations described above with respect to reference plane L. By example, a satellite can be controlled to change its signal relay direction depending upon its position relative to another reference plane other than precisely at the crossing of the reference plane L.

The manner in which the satellite communication system is used for effecting communications between the terrestrial node and the mission platforms will now be described.

In accordance with a preferred embodiment of the invention, communications that are made between the terrestrial node and a mission platform are relayed about a selected one of the subconstellations which provides a most effective relay route for completing the communication mission. It is also preferable that at least one of the satellites comprising the relay route remains within view of the terrestrial node and in a single one of the hemispheres throughout the time required for completely relaying the communication. This assures that the satellites of the relay route provide connectivity for a time which is sufficient for completing the communication, and will not switch relay directions while the communication is being made. These aspects of the invention may be further understood in view of the following exemplary situations.

A first exemplary situation may be understood in view of FIG. 5. For the first exemplary situation, it is assumed that it is desired to communicate between the terrestrial node G and the terrestrial mission platform M2. It is also assumed: (1) that at the desired time of transmission, the satellite constellation has the configuration illustrated in FIG. 5; and (2) at least satellite 10d has been previously controlled by the terrestrial node G in the manner described above such that it relays received signals in a predefined manner within the subconstellation P2.

First, it is determined which satellites from the respective subconstellations P1 and P2 will be in the western hemisphere and in view of the terrestrial node G at the beginning of and throughout the duration of the transmission (also referred to as a "mission"). It is then determined which one of the satellite subconstellations would provide the most efficient communication between the terrestrial node G and the terrestrial mission platform M2. More particularly, a subconstellation is selected in accordance with signalling and traffic requirements to minimize the number of satellite cross-links that are necessary to provide the communication to the terrestrial mission platform M2. These determinations may be made in accordance with such considerations as, by example: (1) the location of the terrestrial mission platform M2; (2) the duration of time expected for completing the communication mission; (3) system loading and communications congestion; (4) relay satellite antenna availability; and (5) data from the satellite ephemeris table (SET) associated with the terrestrial node G.

For example, in view of FIG. 5, it can be seen that the satellite 10d is within the western hemisphere and is within view of the terrestrial node G at the desired time of transmission. Assuming that the satellite 10d will remain in the western hemisphere for a time that is sufficient to complete the communication (which may last for, by example, tens of minutes), it can be seen that the most efficient relay route (i.e., the route which comprises a minimum number of cross-links) for completing the communication is the one comprising: (1) a link between the terrestrial node G and satellite 10d; (2) the cross-link between satellite 10d and satellite 10e; and (3) a link between satellite 10e and the terrestrial mission platform M2. Thus, subconstellation P2 is selected. For the purposes of this description, a relay route for completing a communication is designed as a "mission pathway".

It should be noted that for a case in which it is known that two satellites from a same subconstellation will be in view of the terrestrial node G at the desired time of transmission, one satellite is selected which would provide the most efficient communication between the terrestrial node G and the terrestrial mission platform M2.

After a subconstellation has been selected in the manner described above, the communications controller 54 of the terrestrial node G controls the antenna 12b via the pointing control circuit 55, if needed, to point in a direction towards satellite 10d. A signal is then uplinked from the antenna 12b to the satellite 10d. The uplinked signal carries information specifying, by example, a downlink command and data that is to be communicated to the terrestrial mission platform M2. For the first exemplary situation, the downlink command may specify, by example, that satellite 10e is to downlink the data to the terrestrial mission platform M2.

The uplinked signal is then received by the satellite 10d via antenna 34, whereafter the signal is provided to the communications processor 44 for processing. It is assumed that satellite 10d has been previously controlled by the terrestrial node G to relay signals supplied from the terrestrial node G in a clockwise direction about subconstellation P2. As such, the satellite 10d relays at least a portion of the uplinked signal to satellite 10e. More particularly, the communications controller 42 controls the communications processor 44 to supply a signal to antenna 38. The signal carries information specifying at least the downlink command, and the data that is to be communicated to the terrestrial mission platform M2. From the antenna 38, the signal is then transmitted over the cross-link between satellites 10d and 10e.

After satellite 10e receives the signal via antenna 40, the received signal is processed by the communications processor 44. The communications processor 44 then provides a portion of the received signal specifying the downlink command to the satellite's communications controller 42. Based upon the downlink command the communications controller 42 positions the antenna 32 via the pointing control circuit 45, if needed, to point towards the terrestrial mission platform M2. Thereafter, the communications controller 42 controls the communications processor 44 to supply a signal carrying at least the data to antenna 32, from which the signal is then downlinked to the terrestrial mission platform M2. After the mission is completed as such, a new mission pathway may be established for a new situation of interest in a similar manner as described above.

It should be noted that the first exemplary situation is not intended to limit the scope of the invention. By example, the direction in which the satellite 10d relays the signal supplied from the terrestrial node G may be controlled by information included in the uplinked signal. It should also be noted that the satellites 10d and 10e may also be controlled to relay signals received from the mission platform M2 in a counter-clockwise direction about the subconstellation P2, thereby establishing a bidirectional pathway. It should be further noted that any appropriate number of the satellites of subconstellation P2 may be controlled to relay signals in a specified direction about the subconstellation.

A second exemplary situation may be understood in view of FIG. 1a. In the second exemplary situation, a terrestrial mission platform 24a located on one side of the earth can initiate communications with the terrestrial communications node 12 and an airborne mission platform 22 located on an opposite side of the earth. This situation may arise in cases in which, for example the MEO communication satellite system is logistically supporting U.S. military communications missions within a limited foreign war zone (e.g., Desert Storm). For this exemplary situation, it is assumed that at the desired time of transmission, the satellite communications has the configuration illustrated in FIG. 1a. It is also assumed that at least satellite 10c has been controlled by the terrestrial node 12 in the same manner as described above such that the satellite 10c relays signals supplied to the subconstellation P1 from the terrestrial mission platform 24a in a clockwise direction about the subconstellation P1.

First, it is determined which satellites from the respective subconstellations P1 and P2 will be in view of the terrestrial mission platform 24a and in the same hemisphere as the terrestrial mission platform 24a at the beginning of the mission and throughout a time period within which the mission can be completed. Second, it is determined which one of the satellite subconstellations would provide the most efficient communication between the terrestrial mission platform 24a and the terrestrial node 12. These determinations are performed in a similar manner as described above.

For this exemplary situation, it is assumed that satellite 10c will be within view of the terrestrial mission platform 24a and will be in the same hemisphere as the terrestrial mission platform 24a throughout the time period required for completing the mission. Also, it is assumed that the most efficient mission pathway for completing the communication is the one comprising: (1) an uplink from the terrestrial mission platform 24a to satellite 10c; (2) the cross-link between satellite 10c and satellite 10a; and (3) a downlink from satellite 10a to the terrestrial node 12. Thus, subconstellation P1 is selected.

After a subconstellation and a mission pathway have been selected in the foregoing manner, the terrestrial mission platform 24a provides an uplink signal to the satellite 10c. The signal comprises, by example, data that is to be communicated to the terrestrial node 12 and to the airborne mission platform 22, a first downlink command, and an uplink command. The first downlink command specifies, by example, that the satellite 10a downlink the data and the uplink command to the terrestrial node 12. The uplink command specifies, by example, that the terrestrial node 12 uplink at least a portion of the data to the airborne mission platform 22.

After satellite 10c receives the uplink signal via antenna 32, the signal is processed in the same manner as described above. In accordance with the relay direction previously set by the terrestrial node 12, the communications controller 42 controls the communications processor 44 and the antenna 40, if needed, to provide a signal carrying at least the data, the uplink command, and the first downlink command to the satellite 10a.

Satellite 10a then receives this signal via antenna 38, processes the received signal and, based upon the first downlink command, provides a downlink signal to the terrestrial node 12, in a similar manner as described above. The downlink signal includes at least the data and the uplink command.

After the terrestrial node 12 receives the downlink signal from the satellite 10a, the downlink signal is processed by the communications processor 52. The communications processor 44 then provides at least the uplink command to the communications controller 54. Then, a satellite subconstellation for relaying at least a portion of the data to the airborne mission platform 22 in a most efficient manner is selected in a manner similar to that described above. For this case, the selected subconstellation may be, by example, the one including the satellite 10d which is nearest to the airborne mission platform 22 at the desired time of transmission. Preferably, a mission carried out according to the second exemplary situation is preplanned, and the positions of the satellite 10d and the airborne mission platform 22 are predetermined such that the airborne mission platform 22 is within a "footprint" of satellite antenna 20 at the desired time for downlinking to the airborne mission platform 22. Where the satellite 10d is at an altitude of, by example, 10,000 nautical miles, an antenna beamwidth of 1° provides a minimum "footprint" diameter of approximately 200 nautical miles. Preferably, the "footprint" of the satellite antenna 30 can support communications being made in the zone in which the system is being used.

Thereafter, based upon the uplink command, the communications controller 54 controls the pointing control circuit 55 to position the antenna 12b, if needed, and a signal is uplinked carrying at least a portion of the data and a second downlink command to satellite 10d. The second downlink command specifies, by example, that the satellite 10d relay the uplinked data to the airborne mission platform 22.

Within satellite 10d, the received signal is processed in the manner as described above and the second downlink command is provided to the communications controller 42. Based upon the second downlink command, the communications controller 42 controls the antenna 30 via the pointing control circuit 45, if needed, to point towards the airborne mission platform 22. The communications controller 42 then controls the communications processor 44 to provide the data to the antenna 30 which thereafter transmits the data to the airborne mission platform 22.

It should be noted that the foregoing exemplary descriptions are not intended to be limiting to the scope of the invention. By example, for any of the exemplary situations described above, another mission platform such as, for example, the low earth orbit mission satellite 20 or the airborne mission platform may be substituted for either of the terrestrial mission platforms. It should also be noted that above-described manner in which the terrestrial node controls the satellite antennas for downlinking signals to mission platforms is not intended to be limiting to the invention's scope. By example, the terrestrial node may provide a command to the satellite 10d specifying that the antenna 30 track the airborne mission platform 22, in accordance with information received from the terrestrial mission platform 24a over a global communications network 80. Also, other mission pathways may be utilized to complete communications in addition to those set forth above, including those which are not limited to relaying communications within a single one of the hemisphere.

As can be appreciated, because the MEO communication satellite system is located in medium earth orbit, mission pathways provided by the system are substantially shorter than those which can be provided by a system located in a higher orbit (e.g., geosynchronous (GEO)) orbit. The MEO communication satellite system also requires less transmitter power, antenna area, etc. to relay communications than those required by a higher orbit system. However, the latency (e.g., path delay) of the MEO system is less than half of that of a GEO system. This may be crucial in cases in which, for example, communications are required to be interactive and/or time-critical.

Having described a number of aspects of the invention, a further aspect of the invention will now be described. In the event of a failure or use of the cross-links between satellite of a particular subconstellation, the system performance will degrade. Such degradation may be realized in the form, by example, a lack of satellite availability, a lack of promptness in completing a communication, a lack of capacity, degraded signal quality, etc. Being that the satellites 10a–10c, 10d–10f within the respective subconstellations P1, P2 are controllable from the terrestrial node 12 to relay signals in a particular manner, upon a failure of one of the cross-links between satellites in a particular subconstellation (e.g., subconstellation P2), signals that were to be relayed over the failed cross-link can be redirected to remaining cross-links of the satellite constellation to effect a communication. Preferably, an alternate mission pathway is selected which is a most efficient alternate route.

By example, if two satellites from the same subconstellation as the failed cross-link are within view of the terrestrial node 12 at the desired time of transmission, the mission pathway may be changed so that the signals are re-directed to the satellite which relays the signal over the remaining cross-links of the subconstellation to avoid the failed cross-link. However, if no such satellite is within the field of view of the terrestrial node 12 at the desired time of transmission, or if it would be more efficient to effect a communication over the other subconstellation (e.g., subconstellation P1), the signal may be redirected to this other subconstellation to effect the communication. By example, in the first exemplary situation described above, if the cross-link between satellites 10d and 10e were to fail, then the terrestrial node G can transmit a signal to satellite 10a carrying at least a downlink command and the data that is to be transmitted to the terrestrial mission platform M2. In this case, the downlink command specifies that the data shall be downlinked from the satellite 10b to the terrestrial mission platform M2. Assuming that satellites 10a and 10c have been set to relay signals received from the terrestrial node G in a counterclockwise direction within subconstellation P1, after the signal is received by the satellite 10a, the signal is relayed therefrom to satellite 10c in a similar manner as described above. The signal is then relayed from satellite 10c to satellite 10b. Based upon the downlink command, satellite 10b then downlinks at least the data to the terrestrial mission platform M2 is a similar manner as described above.

Having described the operation of the constellation for effecting communications between the terrestrial node 12 and the mission platforms, a further embodiment of the invention will now be described. In this embodiment of the invention, at least one spare satellite 90 (FIG. 1) is employed to replace a satellite 10a–10f that is non-functioning. The spare satellite is placed in a low earth "parking" orbit. The spare satellite has a high relative angular motion in low earth orbit which enables the satellite to be rapidly aligned in a manner such that, when a perigee and an apogee engine of the satellite are turned on, the spare satellite may be controlled from an earth station (e.g., the terrestrial node 12) to be positioned quickly in order to replace the failed satellite. Being located in low earth orbit, the spare satellite can replace the failed satellite in a more exploitious manner than a spare satellite located in, by example, a Geosynchronous orbit (GEO) or a higher orbit. That is, while the satellite changes its velocity ($\Delta V$) to alter, by example, the altitude of its orbit, the plane of its orbit, and/or the ellipticity of its orbit, in order to replace the failed satellite, the satellite consumes less fuel than higher orbit satellites performing similar tasks. Also, the low earth orbit satellite can be positioned to replace the failed satellite more quickly relative to higher orbit satellites.

According to another aspect of the invention, when two satellites from a particular one of the subconstellations P1, P2 are simultaneously in view of the terrestrial node, the transmission and reception system (including, by example, antenna 34) of one of these satellites normally used for communicating with the terrestrial node can be used to accommodate with, by example, another mission platform.

According to a further aspect of the invention, when a relay satellite is out of view of the terrestrial node 12, the satellite's antenna, receiver and transmitter are available to be used for communications with mission platforms, and may complement the array of mission-dedicated transmission resources.

While the invention has been particularly shown and described with respect to preferred embodiments thereof, it will be understood by those skilled in the art that changes in form and details may be made therein without departing from the scope and spirit of the invention.

What is claimed is:

1. An orbital communication system comprising:
    a Medium Earth Orbit (MEO) satellite constellation having a plurality of satellites orbiting in a single orbital plane, said constellation further comprising:
    multiple satellite subconstellations, orbiting in said single orbital plane, each of said subconstellations having a plurality of satellites therein, each of said satellites in a subconstellation having a direct communication crosslink with adjacent satellites in the same subconstellation, individual satellites within each respective subconstellation being offset from each of two adjacent satellites of at least one of the other subconstellations by a predetermined angle.

2. A satellite constellation as set forth in claim 1, wherein each of the satellite subconstellations comprises at least three cross-linked satellites.

3. A satellite constellation as set forth in claim 1, wherein the predetermined angle is approximately 60□.

4. A satellite constellation as set forth in claim 1, wherein the orbital plane is an equatorial plane.

5. A satellite constellation as set forth in claim 1, wherein at least one satellite from respective ones of the subconstellations is always within a view of each of a terrestrial node and at least one mission platform.

6. A satellite constellation as set forth in claim 1, wherein within each subconstellation the plurality of satellites are arranged in a manner such that before one of the satellites disappears from a field of view of a terrestrial node, another satellite from the subconstellation comes into the field of view of the terrestrial node.

7. A satellite constellation as set forth in claim 1, wherein within each subconstellation the respective plurality of satellites are arranged in a manner such that before one of the satellite disappears from a field of view of a mission platform, another satellite from the subconstellation comes into the field of view of the mission platform.

8. A satellite constellation as set forth in claim 7, wherein the mission platform is one of a satellite in low earth orbit, an aircraft, and a terrestrial-based user-communication system.

9. A satellite constellation as set forth in claim 1, wherein each of the plurality of satellites in each of the subconstellations follows a substantially circular orbit.

10. A satellite constellation as set forth in claim 1, wherein each of the plurality of cross-linked satellites comprises means for transmitting signals to, and for receiving signals from, at least one of a terrestrial node, a mission platform, and another one of the cross-linked satellites.

11. A satellite constellation as set forth in claim 1, wherein each cross-linked satellite of each subconstellation comprises:

means for receiving a signal from at least one of a terrestrial node, a mission platform, and another one of the cross-linked satellites; and means for relaying a received signal to at least one of the terrestrial node, the mission platform, and another one of the cross-linked satellites in accordance with command information received from the terrestrial node.

12. A satellite constellation as set forth in claim 1, wherein each of the satellite subconstellations comprises three cross-linked satellites.

13. A satellite constellation as set forth in claim 1, further comprising at least one spare satellite located in earth orbit, said spare satellite being controllable for being positioned to replace a failed one of the satellites of the subconstellations.

14. A method for providing a signal between a terrestrial node and at least one mission platform via a Medium Earth Orbit (MEO) satellite constellation, comprising the steps of:

providing the MEO satellite constellation so as to comprise at least a first and a second subconstellation, the first subconstellation comprising at least three satellites having a direct communication crosslink with adjacent satellites in the same subconstellation, for relaying signals received by the first subconstellation in a predetermined manner, the second subconstellation comprising at least three satellites having a direct communication crosslink with adjacent satellites in the same subconstellation, for relaying signals received by the second subconstellation in a predetermined manner, the cross-linked satellites of both of the first and second subconstellations lying in a same orbital plane;

selecting one of the first and second subconstellations which can relay the signal between the terrestrial node and the at least one mission platform in a manner that minimizes a number of satellite cross-links;

transmitting the signal from the terrestrial node to the selected one of the subconstellations, the signal carrying at least one downlink command; and based upon the downlink command, downlinking at least a portion of the signal from the selected subconstellation to the at least one mission platform.

15. A method as set forth in claim 14, wherein the manner in which the subconstellations relay signals is determined in accordance with a command signal received from the terrestrial node.

16. A method as set forth in claim 14, wherein signals that are received by individual ones of the first and second subconstellations are relayed about the respective subconstellations in a direction that is dependent on a position of at least one of the satellites of the respective subconstellations relative to a reference plane that intersects said terrestrial node.

17. A method as set forth in claim 14, wherein each of the satellites of the first subconstellation is offset from each of two adjacent satellites of the second subconstellation by approximately a same predetermined angle, and wherein each of the satellites of the second subconstellation is offset from each of two adjacent satellites of the first subconstellation by approximately the same predetermined angle.

18. A satellite-based communication system, comprising:

a terrestrial communication node;

at least one communication mission platform; and a plurality of satellite subconstellation, each of the satellite subconstellations comprising a plurality of satellites having a direct communication crosslink with adjacent satellites in the same subconstellation, each of the plurality of cross-linked satellites of both subconstellations orbiting within a same orbital plane, individual ones of the satellites within each respective subconstellation being offset from each of two adjacent satellites of at least one of the other subconstellations by a predetermined angle;

wherein each cross-linked satellite of each of the subconstellations includes means for bidirectionally communicating with the terrestrial communication node and said at least one communication mission platform while said terrestrial communication node and said at least one communication mission platform are in view of said satellite.

19. A satellite-based communication system as set forth in claim 18, wherein the at least one communication mission platform includes at least one of an aircraft, an orbiting spacecraft, and at least one terrestrial-based mission platform.

20. A satellite-based communication system as set forth in claim 19, wherein said at least one terrestrial-based mission platform is communicatively coupled to said terrestrial communication mode.

21. A satellite-based communication system as set forth in claim 18, wherein said bidirectional communication means of each satellite is also for bidirectionally communicating with one or more other satellites to which said satellite is cross-linked, and wherein said bidirectional communication means of each satellite is controllable for relaying a signal received by the satellite to at least one of the terrestrial communication node, the at least one communication mission platform, and the one or more other satellites to which said satellite is cross-linked.

22. A satellite-based communication system as set forth in claim 18, wherein each of said subconstellations is for relaying communications provided between said terrestrial communication node and said at least one communication mission platform.

23. A satellite constellation as set forth in claim 18, wherein each of the plurality of satellites in each of the subconstellation follows a substantially circular orbit.

* * * * *